United States Patent
Djuricic et al.

(10) Patent No.: US 9,212,098 B2
(45) Date of Patent: Dec. 15, 2015

(54) BLEND FOR THE PRODUCTION OF A REFRACTORY MATERIAL, A REFRACTORY MATERIAL, A METHOD FOR THE MANUFACTURE OF A REFRACTORY MATERIAL, AND USE OF A SUBSTANCE AS A SINTERING AID

(71) Applicant: REFRACTORY INTELLECTUAL PROPERTY GMBH & CO. KG, Vienna (AT)

(72) Inventors: Boro Djuricic, Leoben (AT); Roland Nilica, Feistritz (AT); Klaus Santowski, Frohnleiten (AT)

(73) Assignee: REFRACTORY INTELLECTUAL PROPERTY GMBH & CO., Vienna (AT)

( * ) Notice: Subject to any disclaimer, the term of this patent is extended or adjusted under 35 U.S.C. 154(b) by 0 days.

(21) Appl. No.: 14/234,823
(22) PCT Filed: Apr. 24, 2013
(86) PCT No.: PCT/EP2013/058497
§ 371 (c)(1),
(2) Date: Jan. 24, 2014
(87) PCT Pub. No.: WO2014/048586
PCT Pub. Date: Apr. 3, 2014

(65) Prior Publication Data
US 2014/0349833 A1 Nov. 27, 2014

(30) Foreign Application Priority Data

Sep. 28, 2012 (EP) .................................... 12186593

(51) Int. Cl.
*C04B 35/42* (2006.01)
*C04B 35/465* (2006.01)
(Continued)

(52) U.S. Cl.
CPC ........... *C04B 35/6303* (2013.01); *C04B 35/047* (2013.01); *C04B 35/12* (2013.01); *C04B 35/42* (2013.01); *C04B 35/465* (2013.01); *C04B 35/66* (2013.01); *F27D 1/0006* (2013.01)

(58) Field of Classification Search
CPC ...... C04B 35/12; C04B 35/047; C04B 35/465
See application file for complete search history.

(56) References Cited

U.S. PATENT DOCUMENTS

| 3,194,672 A | 7/1965 | Davies et al. |
| 3,551,172 A | 12/1970 | Guile |

(Continued)

FOREIGN PATENT DOCUMENTS

| DE | 1571328 A1 | 2/1971 |
| EP | 0573029 A2 | 12/1993 |

(Continued)

OTHER PUBLICATIONS

Matteucci, et al., "Crystal structure, optical properties and colouring performance of karrooite MgTi2O5 ceramic pigments", Journal of Solid State Chemistry 180, 2007, pp. 3196-3210, Elsevier Inc.

*Primary Examiner* — Karl Group
(74) *Attorney, Agent, or Firm* — Walker & Jocke

(57) ABSTRACT

The invention relates to a blend for the production of a sintered refractory material containing chromium oxide, a sintered refractory material containing chromium oxide, a method for the manufacture of a sintered refractory material containing chromium oxide and to a use of magnesium titanate.

7 Claims, 2 Drawing Sheets

(51) Int. Cl.
*C04B 35/63* (2006.01)
*C04B 35/047* (2006.01)
*C04B 35/12* (2006.01)
*C04B 35/66* (2006.01)
*F27D 1/00* (2006.01)

(56) References Cited

U.S. PATENT DOCUMENTS

| | | |
|---|---|---|
| 4,141,743 A | 2/1979 | Grubba |
| 4,999,325 A | 3/1991 | Michael et al. |
| 5,180,698 A | 1/1993 | Merzhanov et al. |
| 5,426,078 A | 6/1995 | Heindl |
| 5,595,948 A * | 1/1997 | Kimura et al. ............... 501/108 |
| 6,548,435 B1 | 4/2003 | Bugajski |
| 2014/0013807 A1 | 1/2014 | Olivier Citti et al. |

FOREIGN PATENT DOCUMENTS

| | | |
|---|---|---|
| EP | 0940376 A1 | 9/1999 |
| EP | WO2012110923 A1 | 8/2012 |
| GB | 1096408 A | 12/1967 |
| GB | 1533890 A | 11/1978 |
| JP | 1061351 A | 3/1989 |
| WO | 2004063652 A2 | 7/2004 |

* cited by examiner

BLEND FOR THE PRODUCTION OF A REFRACTORY MATERIAL, A REFRACTORY MATERIAL, A METHOD FOR THE MANUFACTURE OF A REFRACTORY MATERIAL, AND USE OF A SUBSTANCE AS A SINTERING AID

The invention relates to a blend for the production of a sintered refractory material containing chromium oxide, a sintered refractory material containing chromium oxide, a method for the manufacture of a sintered refractory material containing chromium oxide and to a use of magnesium titanate.

The term "refractory material" in the context of the invention in particular indicates ceramic products with a service temperature of more than 600° C., preferably refractory materials complying with DIN 51060, i.e. materials with a pyrometric core equivalent of more than SK17.

Refractory materials are known in the form of shaped refractory products, for example, bricks, and refractory products which have not been shaped, in particular refractory cements, refractory masses and refractory mortars.

In particular, refractory materials are constructed from ceramic raw materials, in particular the oxides silicon dioxide ($SiO_2$), aluminium oxide ($Al_2O_3$), magnesium oxide (MgO), calcium oxide (CaO), zirconium dioxide ($ZrO_2$) and chromium oxide ($Cr_2O_3$). Since chromium oxide ($Cr_2O_3$) has the particular property of increasing the corrosion resistance of refractory materials, in particular against aggressive melts and slags, refractory materials are used which have a high proportion of chromium oxide ($Cr_2O_3$) if high corrosion resistance is required in a refractory material.

Refractory blends are used for the manufacture of refractory materials. These blends in particular comprise those components from which the refractory material is formed upon ceramic firing. In order to manufacture the refractory material, as a rule the blend is first mixed with a binder and then fired. If a shaped refractory product is to be produced using the blend, then after mixing with the binder and before firing, the blend is shaped.

Firing in particular causes sintering of the components of the blend. After firing, a sintered refractory ceramic material is obtained.

Densification is difficult when firing and sintering blends with a proportion of chromium oxide ($Cr_2O_3$) since, as a function of the partial pressure of oxygen and the temperature, chromium oxides with a high vapour pressure are formed. Thus, the combustion conditions of the firing atmosphere and partial pressure of the combustion gases must be accurately set.

Chromium can be present with oxidation numbers (oxidation states) of +6, +4, +3 or +2, as well as oxidation state 0 for metallic chromium, depending on the partial pressure of oxygen on firing. With the exception of chromium oxide in the form of $Cr_2O_3$, in which the chromium has oxidation number +3, all other chromium oxides have a high vapour pressure. In particular, when blends with a high chromium oxide content are fired and sintered, sintering aids are therefore required in order to obtain sintering of the chromium oxide on firing. In addition, the firing conditions as set out above have to be precisely set as regards the firing atmosphere and the partial pressure of the oxygen.

Examples of sintering aids for chromium oxide are additives in the form of zirconium dioxide, titanium dioxide, magnesium oxide or silicates.

However, even when sintering aids of this type are used in the blend, it is frequently very difficult to fire a blend with a high chromium oxide content to a refractory material or alternatively to sinter the chromium oxide to a sufficient density on firing. In particular, it is difficult to sinter refractory materials with a high chromium oxide content to a density as high as possible.

In the past, many attempts have been made to develop techniques by means of which refractory materials with a high sintered chromium oxide content can be made available with as high a density as possible. EP 0 546 432 B1, for example, describes such a technique. According to that document, chromium oxide and titanium oxide are mixed, shaped and fired in a reducing atmosphere in a first firing procedure, comminuted, mixed with chromium oxide which has not been fired, shaped and finally reduction fired in a second firing procedure. Thus, such a method requires two firing procedures and therefore can only be carried out at great expense.

The aim of the invention is to provide a technique by means of which a material containing a sintered chromium oxide can be provided. In particular, the technique provides a ceramic refractory material which is sintered and densified to the maximum extent. In addition, the refractory material will have a sintered chromium oxide content which is as high as possible. In particular, the aim of the invention is also to provide a blend for the production of such a refractory material containing a sintered chromium oxide. The present invention also aims to provide such a refractory material containing sintered chromium oxide. Finally, in a further aspect of the invention, a method for the manufacture of such a material containing sintered chromium oxide is provided.

Figure 1:
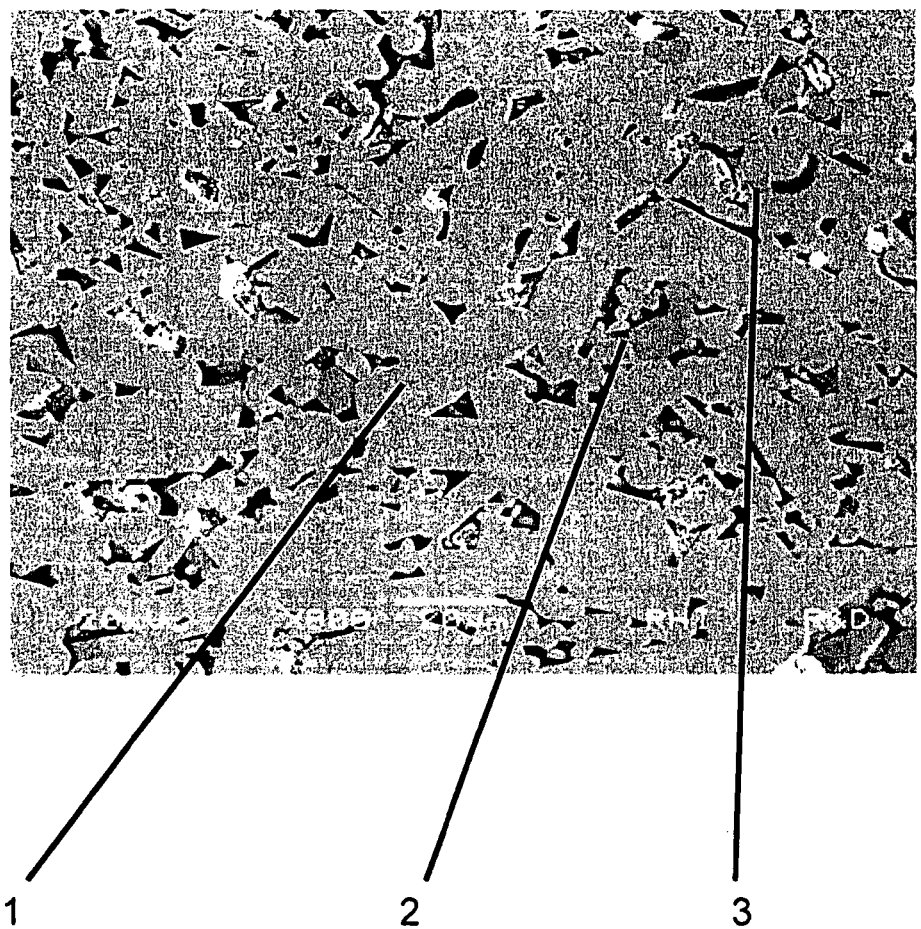
FIG. 1 shows a microscopic image of the surfaces of polished sections of a refractory Material in accordance with an exemplary embodiment.

These aims are achieved by means of a blend for the production of a refractory material containing sintered chromium oxide which comprises the following components:

chromium oxide;
magnesium titanate; as well as
optionally, other components.

In particular, the invention is based on the recognition that magnesium titanate acts as a sintering aid for chromium oxide. In particular, the inventors of the present invention have discovered that magnesium titanate can be used as a sintering aid to support sintering of chromium oxide during firing of blends comprising chromium oxide for the production of refractory ceramic materials. In the context of the invention, it has been observed that magnesium titanate in a blend comprising chromium oxide acts such that on firing of the blend, the chromium oxide is sintered in an excellent manner and after firing and sintering of the chromium oxide, the presence of magnesium titanate in a blend comprising chromium oxide can in particular produce a high density refractory ceramic material.

The inventors postulate that the effect of magnesium titanate as a sintering aid for chromium oxide is based on the fact that magnesium titanate suppresses the formation of volatile chromium oxides, i.e. chromium oxides with a high vapour pressure at high temperatures.

If magnesium titanate is used in the form of geikielite (MgTiO$_3$) in a blend of the invention, the chemical reaction between magnesium titanate and chromium oxide on firing could be as follows:

$$4MgTi^{4+}O_3 + Cr^{3+}_2O_3 = 2Mg_2Cr^{4+}O_4 + Ti^{3+}_2O_3 + 2Ti^{4+}O_2$$

If magnesium titanate is used in the form of qandilite (Mg$_2$TiO$_4$) in the blend of the invention, the chemical reaction between magnesium titanate and chromium oxide on firing could be as follows:

$$2Mg_2Ti^{4+}O_4 + Cr^{3+}_2O_3 = 2Mg_2Cr^{4+}O_4 + Ti^{3+}_2O_3$$

The "in situ" reaction product Ti$_2$O$_3$ formed on firing appears to suppress the formation of volatile chromium oxide types, for example in accordance with the following reactions:

$$Ti^{3+}_2O_3 + 2Cr^{4+}O_2 = 2Ti^{4+}O_2 + Cr^{3+}_2O_3$$

$$3Ti^{3+}_2O_3 + 2Cr^{6+}O_3 = 6Ti^{4+}O_2 + Cr^{3+}_2O_3$$

The magnesium chromate formed as an intermediate is converted into the phases magnesium chromite and magnesium oxide which are stable over the whole temperature range.

Depending on the mole ratio of magnesium oxide (MgO) to titanium dioxide (TiO$_2$), the magnesium titanate can be present as geikielite (MgTiO$_3$) with a mole ratio of MgO to TiO$_2$ of 1:1 or in the form of qandilite (Mg$_2$TiO$_4$) with a mole ratio of MgO to TiO$_2$ in the range 2:1 to 1:1. At a mole ratio of MgO to TiO$_2$ in the range 1:2 to 1:1, the magnesium titanate is in the form of karrooite (MgTiO$_5$). Theoretically, the mole ratio of MgO to TiO$_2$ in magnesium titanate can be in the range 1:10 to 10:1. Preferably, the ratio of MgO to TiO$_2$ in the magnesium titanate used in accordance with the invention is in the range 1:2 to 2:1. Preferably, the magnesium titanate in the blend of the invention is therefore present in the form of geikielite, qandilite, karrooite or a mixture of these magnesium titanate materials.

Preferably, the magnesium titanate is present as pure to high purity magnesium titanate components in the blend of the invention. As an example, the magnesium titanate may be present in a purity of more than 95%, and thus also, for example, in a purity of more than 98% or more than 99% in the magnesium titanate component (with respect to the mass of magnesium titanate component).

In particular, the magnesium titanate may be present in the form of a synthetic magnesium titanate component which in particular may be formed from pure MgO and TiO$_2$.

In accordance with the invention, at least a portion of the magnesium titanate may be replaced by at least one of the following substances: manganese titanate, cobalt titanate, zinc titanate, nickel titanate or iron titanate. In this manner, at least a portion of the magnesium titanate may be replaced by one or more titanates of metals which can be integrated into spinels.

In accordance with the invention, it has been ascertained that magnesium titanate is particularly advantageous in that it acts as a sintering aid for chromium oxide when the magnesium titanate component has a very small grain size in the blend. Preferably, the D$_{90}$ grain size of the magnesium titanate component is less than 20 μm, and thus also, for example, in a D$_{90}$ grain size of less than 19 μm, less than 18 μm or even less than 15 μm.

Preferably, the magnesium titanate is present in the blend of the invention in proportions such that on firing, the magnesium titanate reacts completely or at least substantially with the chromium oxide in the blend. Preferably, the magnesium titanate is present in a proportion of at most 20% by weight in the blend, and thus also, for example, in a proportion of at most 16%, 14%, 12%, 10%, 8%, 7% or 6% by weight. Further, the magnesium titanate in the blend of the invention may be present in a proportion of at least 1% by weight, and thus also, for example, in a proportion of at least 2% or 2.5% or 3% or 3.5% or 4% by weight.

Unless otherwise indicated, all information regarding the proportions of the phases and components in the blend of the invention or in the refractory material of the invention are given as the proportions as a % by weight, each time with respect to the total mass of the blend of the invention or with respect to the total mass of the refractory material of the invention.

The chromium oxide in the blend of the invention is in the form of a chromium oxide component which, for example, may comprise one or more substantially pure to high purity chromium oxide components and/or, for example, one or more impure chromium oxide components, wherein in the latter, the chromium oxide is, for example, in a mixture or in combination with other substances, in particular as a mixed oxide with other oxides, for example with one or more of the following oxides: aluminium oxide (Al$_2$O$_3$), silicon dioxide (SiO$_2$), iron oxide (Fe$_2$O$_3$), titanium dioxide (TiO$_2$), calcium oxide (CaO), magnesium oxide (MgO) or zirconium oxide (ZrO$_2$). As an example, the chromium oxide in the impure chromium oxide component may also be present in mixtures of a plurality of such mixed oxides. The mixed oxides formed from the aforementioned oxides can, for example, be one or more of the following mixed oxides: aluminium oxide-chromium oxide, aluminium oxide-chromium oxide-zirconium oxide, chromium oxide-zirconium oxide, chromium oxide-aluminium oxide-silicon oxide (for example chromium oxide-mullite), or magnesium oxide-chromium oxide, for example in the form of chromite or picrochromite.

If the chromium oxide in the blend of the invention is present, for example, as an impure chromium oxide component, it may, for example, also be present in the form of a recycled material containing chromium oxide which, for example, has been produced using comminution and preparation techniques which are known in the art and are introduced into the blend in this form.

Unless otherwise indicated, the term "chromium oxide" as used in the context of the invention means chromium oxide in the form of Cr$_2$O$_3$.

If the chromium oxide in the blend of the invention is present, for example, as a substantially pure to high purity chromium oxide component, it may in particular be present as eskolaite, for example in a purity of more than 90% by weight, and thus also, for example, in a purity of more than 92%, 95%, 96%, 98%, 99% by weight, respectively with respect to the quantity of chromium oxide (Cr$_2$O$_3$) in the eskolaite. In accordance with a preferred embodiment, the chromium oxide in the blend is present exclusively or in an amount of at least 95% by weight with respect to the chromium oxide component as a high purity synthetic chromium oxide component, in particular in the form of eskolaite. The chromium oxide components may preferably be present in the sintered form or as a melt, for example in a purity of more than 95% by weight, expressed as the Cr$_2$O$_3$, with respect to the fraction of chromium oxide in the chromium oxide component.

At least the major proportion or all of the chromium oxide component preferably has a D$_{90}$ granulometry ≤45 μm. Preferably, the maximum grain size of the pure to high purity chromium oxide component and/or the impure chromium oxide components are in this granulometry range in the blend of the invention. Furthermore, in accordance with the invention, the maximum grain size of the pure to high purity chromium oxide component and/or the impure chromium oxide component in particular does not exceed a grain size of 0.2 mm or 0.3 mm.

Preferably, the granulometry of the pure chromium oxide component in the blend is finer than the impure chromium oxide component. As an example, the $D_{90}$ value for the impure chromium oxide component is larger by at least a factor of 3 or 5 or 7 or even 8 than the $D_{90}$ value for the pure chromium oxide component. An advantage of considerably coarser impure chromium oxide components is due, for example, to the fact that that substances which may be present therein which have a deleterious effect on sintering of the chromium oxide components upon sintering of the blend will diffuse out of the grains to a lesser extent to have a deleterious effect on sintering.

In accordance with a particularly preferred embodiment, the granulometry of the chromium oxide component in the blend of the invention is coarser than the magnesium titanate component. As an example, the $D_{90}$ value of the chromium oxide component can be larger by at least a factor of 1.5 to 2 or 2.5 or even 3 than the $D_{90}$ value of the magnesium titanate component.

It is also possible for the magnesium titanate component to be present in a similar or coarser granulometry in the blend than the chromium oxide component. However, the particular disadvantage in this case is that the diffusion processes necessary for the sintering process could be inhibited. In addition to poorer sintering of a material produced from such a blend, this may have the result that the magnesium titanate component in the blend might not be as effective and/or might be required in a larger amount.

As indicated above, the blend of the invention comprises chromium oxide, in particular in a very fine granulometry, namely a $D_{90}$ granulometry ≤45 μm and with a maximum grain size of no more than 0.2 mm or 0.3 mm. In addition to this fine granulometry, the blend may comprise a component with a coarser granulometry, in particular a granulometry of at least 0.3 mm, hereinafter termed the "coarse component". This coarse component can in particular be present in a grain size in the range 0.3 mm to 6.0 mm or 4.0 mm in the blend.

In this respect, then, the blend of the invention preferably has a distinct grain size gap in the granulometry range 45 μm to 0.3 mm. In particular in this regard, a maximum of 10% by weight, and thus also, for example, a maximum of 9%, 8%, 7%, 6%, 5%, 4%, 3% or 2% by weight of the components of the blend may have a grain size in the range 45 μm to 0.3 mm.

The coarse component may be formed by one of the following components: a component formed from pure chromium oxide, a component comprising chromium oxide or a component which is free of chromium oxide.

If the coarse component comprises pure chromium oxide, it may, for example, be present as eskolaite, for example in the degree of purity cited above.

If the coarse component is present as a component comprising chromium oxide, the chromium oxide may, for example, be present in the component as a mixture or compound with other substances, for example in the form of one or more of the mixed oxides of chromium oxide cited above.

If the coarse component comprises a chromium oxide-free component, it can in principle be present in the form of any refractory material, for example in the form of a refractory material formed from one or more of the following components: silicon dioxide, aluminium oxide, magnesium oxide, calcium oxide, zirconium dioxide, iron oxide or titanium dioxide. Particularly preferably, the chromium oxide-free coarse component can be present for example in the form of at least one of the following refractory materials: zirconium mullite, zirconium corundum or corundum.

If the blend comprises an appropriate coarse component, the components of the blend with a grain size of less than 45 μm in particular sinter upon ceramic firing to form a matrix, or they form a binding matrix in which the components of the blend with a coarser grain size, in particular the components of the coarse component with a grain size of 0.3 mm and higher, are embedded.

If the blend has a coarse component, i.e. a granulometry with a grain size of at least 0.3 mm, then in accordance with the invention in particular, the blend comprises this coarse component in a proportion of at most 85% by weight, and thus, for example, in a proportion of at most 80%, 70%, 60%, 50%, 40%, 30%, 20% or 10% by weight. Correspondingly, if it comprises such a coarse component, the blend may have a proportion of chromium oxide component with a grain size of less than 45 μm of at least 15% by weight, and thus also, for example, a proportion of at least 20%, 30%, 40%, 50%, 60%, 70%, 80% or 90% by weight; in accordance with the invention, it has been shown that a blend which comprises smaller quantities of chromium oxide components with a grain size of less than 45 μm cannot always form a binding matrix in sufficient quantity to be able to bind the coarse component upon ceramic firing.

When details regarding the $D_{90}$ values of these components are given for the blend components, the associated grain size distribution curves may in particular correspond to the usual known grain size distribution curves which are known in the art, in particular those given for these components from known prior art manufacturing and fractionation methods for these components.

In principle, any proportion of chromium oxide can be employed in the blend of the invention. In particular, the proportion of chromium oxide in the blend can be dependent on the type and composition of the chromium oxide component and the coarse component. In one embodiment, the proportion of chromium oxide in the blend is at least 80% by weight, and thus also, for example, at least 82%, 84%, 86%, 88%, 90%, 92%, 94%, 96% or also 98% by weight. In particular, if the proportion of chromium oxide in the blend is over 90% by weight, this can be achieved if the chromium oxide is at least substantially present in the blend in the form of pure or high purity chromium oxide components.

The proportion of chromium oxide in the blend can in particular be obtained by mixing quantities of pure and impure chromium oxide components.

Using the blend of the invention, it is possible to produce a very dense sintered refractory ceramic material with a high proportion of sintered chromium oxide, in particular also with chromium oxide contents of more than 80% by weight or even more than 90% by weight. With known prior art techniques, it has until now been practically impossible to produce a very dense sintered refractory material which has such high proportions of chromium oxide.

If at least a portion of the chromium oxide is present in the blend of the invention at least partially in the form of one or more chromium oxide components which are formed from mixed oxides and/or if the coarse component comprises components which are not formed from pure chromium oxide or even do not comprise any chromium oxide, the fraction of chromium oxide in the blend can also be substantially below 80% by weight, and thus, for example only at least 8% by weight, and also, for example, only at least 20%, 40%, 60% or 70% by weight.

The quantity of chromium oxide in the blend of the invention is expressed in each case as the fraction by weight of $Cr_2O_3$ in the blend as a whole.

In addition to the components of the blend of the invention mentioned above, i.e. in particular the components containing chromium oxide and magnesium titanate, the blend may contain other components, in particular other components which are typically used in blends for the production of refractory materials, i.e., for example, refractory oxide or non-oxide materials, for example materials formed from one or more of the following components: silicon dioxide, aluminium oxide, magnesium oxide, calcium oxide, zirconium dioxide, iron oxide, or titanium dioxide. In particular, these other components may be present in the blend as coarse components.

In accordance with the invention in particular, the blend of the invention may not include, or only include in small quantities, specific components which inhibit or prevent the formation of a sintered, in particular densely sintered refractory material containing chromium oxide from the blend of the invention. In the context of the invention, it has in particular been shown that alkalis, transition metals or substances which contain such components can deteriorate the sintering properties of the blend of the invention. In accordance with the invention, then, alkalis, transition metals or compounds thereof, in particular oxides, for example $Na_2O$, $K_2O$ or vanadium dioxide, each are present in the blend in proportions of less than 2% by weight, in particular in proportions of less than 1% by weight, less than 0.5% by weight or even less than 0.1% by weight. In addition, even $SiO_2$ can have a deleterious effect on the sintering properties of the blend of the invention, it is possible for the $SiO_2$ to be present in the blend in proportions of less than 4% or 3% or 2% or 1% by weight. Since the deleterious effect of $SiO_2$ in the blend of the invention is in particular dependent on the granulometry of the components containing $SiO_2$, then it is possible for the proportion of $SiO_2$ in the blend to be less than 2% by weight or even less than 1% by weight as far as the components containing $SiO_2$ are present with a granulometry with $D_{90}$ values under 300 μm; as far as components containing $SiO_2$ are present with a coarser granulometry, i.e. in particular with $D_{90}$ values of over 300 μm, the proportion of $SiO_2$ in the blend can be up to 5% or 4% or 3% by weight.

The invention also provides a sintered refractory material containing chromium oxide which is obtained or produced by firing a blend of the invention as described herein. The sintered refractory material containing chromium oxide is obtained by ceramic firing of the blend of the invention. In this manner, components of the blend of the invention, and in particular the component or components containing chromium oxide of the blend, is/are sintered. Finally, a sintered refractory material containing chromium oxide is obtained.

Furthermore, the invention provides a refractory material which can in particular be produced by firing a blend in accordance with the invention as described herein and comprising:
- sintered chromium oxide;
- magnesium chromite;
- titanium dioxide; as well as
- optionally, other components.

In accordance with the reaction equations given above, magnesium titanate and chromium oxide react upon ceramic firing of the blend of the invention to form chromium oxide, magnesium chromite ($MgCr_2O_4$) and titanium dioxide ($TiO_2$). A refractory material produced from a blend of the invention by ceramic firing thus comprises proportions of chromium oxide, in particular sintered chromium oxide, magnesium chromite as well as titanium dioxide.

In particular, magnesium titanate and chromium oxide react together upon ceramic firing of the blend of the invention to form chromium oxide, magnesium chromite and titanium dioxide if they have a small grain size, in particular a grain size of less than 0.3 mm in the blend, in particular if they are present in a grain size of less than 0.3 mm and with a $D_{90}$ granulometry ≤45 μm or indeed they all have a grain size of less than 45 μm in the blend. The coarser fractions of chromium oxide or components comprising chromium oxide in the blend, in particular including the coarse components, react to a lesser extent with the magnesium titanate of the blend. If in addition to components in the blend with the small grain size mentioned above, a coarse component is present, the components with a small grain size form a binding matrix in which the coarse component with a grain size of 0.3 mm and higher is embedded.

As an example, chromium oxide can be present in the refractory material of the invention, if this is produced with no coarse components in the blend, in proportions of at least 60% or 70% by weight, for example. Particularly preferably, the proportion of chromium oxide in the refractory material of the invention is at least 80% by weight, and thus also, for example, at least 82%, 84%, 86% or 88% by weight. Furthermore, the proportion of chromium oxide in the refractory material can, for example, be at most 94% by weight, and thus also, for example, at most 92%, 90% or 88% by weight.

As an example, magnesium chromite may be present in the refractory material of the invention, if the latter is produced from a blend comprising no coarse components, in proportions of at least 3% by weight, and thus also, for example, in proportions of at least 5%, 7%, 10% or 12% by weight. Furthermore, the proportion of magnesium chromite in the refractory material may be at most 30% by weight, and thus also, for example, at most 27%, 25%, 22%, 20%, 17%, 15% or 12% by weight.

As an example, titanium dioxide can be present in the refractory material of the invention, if the latter is produced from a blend comprising no coarse component in a proportion of at least 1% by weight, and thus also, for example, in proportions of at least 2%, 3% or 4% by weight. Furthermore, the proportion of titanium dioxide in the refractory material may, for example, be at most 10% by weight, and thus also, for example, at most 8%, 6%, 4%, 3% or 2% by weight.

If the refractory material of the invention is produced from a blend which comprises coarse components, the information given above regarding the proportions of chromium oxide, magnesium chromite and titanium dioxide apply to the binder matrix in which the coarse component is embedded following ceramic firing. As regards the proportions by weight and composition of the coarse component in the refractory product, the corresponding details regarding the proportions by weight and the composition of the coarse component in the blend apply, since these are practically unchanged during ceramic firing.

In addition to chromium oxide, magnesium chromite and titanium dioxide and optional coarse components, the refractory material of the invention may comprise other components, in particular, for example, one or more of the other components or substances mentioned above which blends for the production of refractory materials might typically contain, as well as mixtures or reaction products of these components or substances.

In a further aspect, the invention provides a method for the manufacture of a sintered refractory material containing chromium oxide having the following steps:
- providing a blend in accordance with the invention as described herein;
- firing the blend to form a refractory material.

The blend of the invention which is provided may be supplemented with a binder. In this regard, any known binder for blends comprising chromium oxide or for chromium oxide-rich blends may be used, for example at least one organic, in particular a temporary organic binder such as polyvinyl alcohol, methyl cellulose or dextrin. The binder may be present in the blend in quantities in the range 1% to 15% by weight, wherein the proportion can in particular be dependent on the further treatment of the blend, in particular, for example, the type of shaping.

The blend, in particular provided with a binder, can be mixed so that the components of the blend and the binder are mixed together as evenly as possible.

Following mixing in particular, the blend can be shaped so that a shaped refractory product, i.e. a refractory brick in particular, can be produced. In particular, the blend can be shaped by pressing to form a shaped product. The unfired shaped body (green body) obtained by shaping can then be dried, for example in a dryer, before it is fired.

After the blend is optionally treated in one or more of the steps of the method described above, it is fired to form a refractory material. During such ceramic firing, the chromium oxide of the blend in particular is sintered so that the refractory material obtained after firing contains sintered chromium oxide.

Particularly preferably, firing is a reduction firing, i.e. firing in a reducing atmosphere. In order to carry out a reduction firing, in accordance with the invention, in particular, the blend can be fired in the presence of coal, in particular in the presence of ground coal. In accordance with a particularly preferred embodiment, firing is carried out over ground coal, whereupon highly advantageous reducing conditions are established for firing of the blend.

In particular, in accordance with the invention, the blend is fired at a temperature in the range 1600° C. to 1800° C., particularly preferably at a temperature in the range 1630° C. to 1670° C. In particular, if firing is carried out in the temperature range indicated above, the firing time (time held at the sintering temperature) can be in the range 3 to 9 hours, particularly preferably in the range 4 to 8 or in the range 5 to 7 hours.

A refractory material of the invention is generally characterized by a typical microstructure. As a rule, the microstructure of the refractory material is a matrix of chromium oxide in which magnesium chromite is embedded. The matrix of chromium oxide is essentially formed by grains of chromium oxide which are sintered together. The magnesium chromite is typically in the form of grains, i.e. in the form of individual "islands" embedded in the matrix of chromium oxide. Typically, the microstructure is characterized by a very even pore structure. The pores of the refractory material typically have a very regular pore size which as a rule is significantly below the grain size of the grains of chromium oxide. The titanium dioxide is finely distributed in the chromium oxide microstructure, whereas in the magnesium chromite grain, smaller quantities of titanium dioxide are measured than in the surrounding chromium oxide grains. Optionally, residues of metallic chromium may be present in the refractory material; as a rule, however, the quantity is less than 1% by weight. If this metallic chromium is present in the material, this is typically in the edge region of the grains of magnesium chromite.

The details given above regarding the microstructure of a material of the invention apply when it is produced from a blend which does not comprise a coarse component. If the refractory material of the invention is produced from a blend which comprises a coarse component, the binding matrix in which the grains of the coarse component are embedded has the microstructure described above. The grains of the coarse component are embedded in this microstructure as large "islands".

A refractory material of the invention is characterized by a relatively high density for refractory materials with a high sintered chromium oxide content. As an example, the bulk density of a refractory material of the invention can be in the range 4.3 to 4.9 g/cm$^3$, and thus also, for example, in the range 4.5 to 4.8 g/cm$^3$ or in the range 4.55 to 4.75 g/cm$^3$. The bulk density can in particular be determined in accordance with DIN standard EN 993-1:1995.

In addition, the refractory material of the invention can be characterized by a relatively low porosity for refractory materials with a high sintered chromium oxide content. As an example, the open porosity of the refractory material of the invention can be in the range 1% to 20% by volume, and thus also, for example, in the range 2% to 15% or in the range 2% to 10% by volume, respectively with respect to the volume of the refractory product. The open porosity can in particular be determined in accordance with DIN standard EN 993-1:1995.

The refractory material of the invention may be any refractory material and be shaped into any product. As an example, the refractory material of the invention may be a shaped refractory product or a refractory product which has not been shaped. Preferably, the refractory material of the invention is a shaped refractory product, i.e. in particular, for example, a refractory brick. Thus, the blend of the invention is particularly suitable for the production of such a refractory material and is constructed accordingly.

In a further aspect, the invention concerns the use of magnesium titanate as a sintering aid to support sintering of chromium oxide when firing blends comprising chromium oxide. The magnesium titanate can thus be used in accordance with the inventive technique described herein.

The refractory material of the invention and the refractory material which can be produced using the blend of the invention may in particular be used where highly corrosion-resistance refractory materials are required, i.e., for example, in the iron and steel industry, the nonferrous industry, the glass industry, in coal gasification or in waste incineration.

A first exemplary embodiment of a blend of the invention without a coarse component is as follows: the blend has a proportion of chromium oxide component of approximately 96% by weight and a proportion of magnesium titanate component of approximately 4% by weight. The proportion of chromium oxide in the chromium oxide component is approximately 95% (with respect to the chromium oxide component), whereby the fraction of chromium oxide in the blend is approximately 91% by weight. The chromium oxide component also contains quantities of the oxides aluminium oxide, silicon dioxide, iron oxide, calcium oxide, magnesium oxide and zirconium dioxide, wherein some of these oxides, in particular silicon dioxide, are only present in trace amounts. The magnesium titanate is present in the form of a high purity, synthetically produced magnesium titanate component in a purity of more than 99% by weight of magnesium titanate (with respect to the magnesium titanate component). The quantity of magnesium titanate in the blend is thus approximately 4% by weight. The chromium oxide component is present as grains with a $D_{90}$ grain size of 45 μm and the magnesium titanate component is also present in the form of grains with a $D_{90}$ grain size of 20 μm.

A second exemplary embodiment of a blend of the invention with a coarse component is as follows: the blend has a proportion of 45% by weight of a first, finer granulometry with a composition in accordance with the above first exemplary embodiment. In addition, the blend has a proportion of coarse component amounting to 55% by weight. The coarse component is composed of a component formed from pure chromium oxide, a component comprising chromium oxide and a chromium oxide-free component. The coarse component has the following components in the following respective proportions, each with respect to the total mass of the blend: pure chromium oxide 25% by weight with a grain size of 1.0 to 3.0 mm; chromium oxide-comprising component in the form of aluminium-chromium oxide in a proportion of 20% by weight and a grain size of 0.3 to 2.0 mm and in the form of chromium oxide-zirconium oxide in a proportion of 6% by weight and a grain size of 0.3 to 3.0 mm; chromium oxide-free component in the form of zirconium mullite in a proportion of 4% by weight and a grain size of 1.6 to 3.2 mm.

One exemplary embodiment of a refractory material of the invention which is based on a blend containing no coarse component is as follows: the refractory material has a proportion of chromium oxide of approximately 80% by weight, a proportion of magnesium chromite of approximately 12% by weight, a proportion of titanium dioxide of approximately 3% by weight and a proportion of approximately 5% by weight of other components. The other components are the oxides aluminium oxide, silicon dioxide, iron oxide, calcium oxide, magnesium oxide and zirconium dioxide or mixed oxides formed from these oxides, wherein these oxides (in particular silicon dioxide) and mixed oxides could in part be present in only trace amounts.

One exemplary example of a method in accordance with the invention is as follows: firstly, a blend in accordance with the first exemplary example is provided. A binder in the form of polyvinyl alcohol, in the form of a solution in water in a concentration of 11% by weight of polyvinyl alcohol with respect to the binder, is added to the blend. The binder is added to the blend in an amount of 5% of the blend weight. The blend supplemented with binder is mixed and then shaped to a green body by pressing. Next, the green body is heated at a heating rate of 120° C./h to a firing temperature of 1650° C. and fired at this temperature for 6 hours. Firing is carried out under reducing conditions, in which the green body is placed on ground coal in a closed furnace and fired. Next, the fired product is cooled, and a refractory material in the form of a shaped refractory product is obtained.

Further features of the invention will become apparent from the patent claims, the figures and the accompanying description of the figures.

Any of the features of the invention can be combined with any of the other features in any combination.

The accompanying figures show microscopic images of the surfaces of polished sections of exemplary examples of refractory materials in accordance with the invention which were produced on the basis of a blend with no coarse component.

The images were recorded at 800 times magnification. The white bar in the lower region of the images represents a length of 20 μm.

The refractory material of FIG. 1 was produced using a method in accordance with the exemplary example described above.

The chromium oxide grains (1) have been substantially sintered together so that the grain boundaries are now practically invisible. FIG. 1 shows the bright lengthwise cut surfaces of the chromium oxide grains (1). Embedded in the sintered grains of chromium oxide (1) is magnesium chromite (2). Further, pores (3) can be seen.

Figure 2:
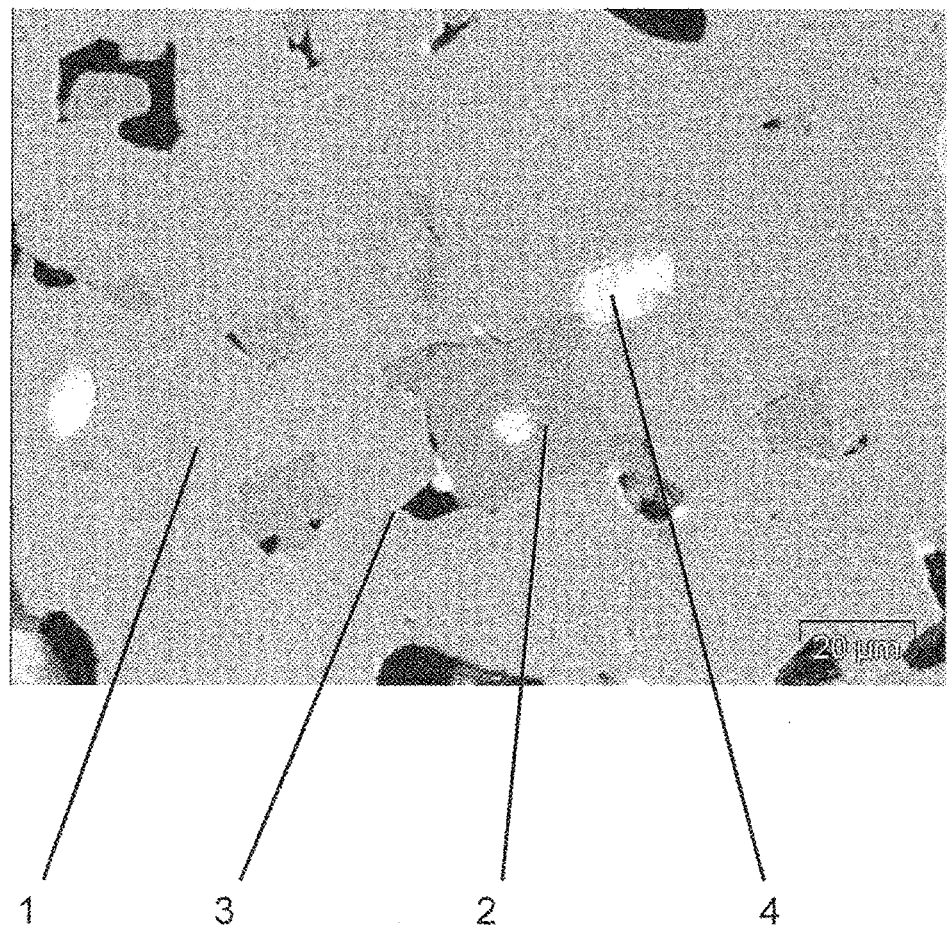
FIG. 2 shows a microscopic image of the surfaces of polished sections of a refractory Material in accordance with another exemplary embodiment.

In the exemplary example shown in FIG. 2, in contrast to the blend, material and method described in the exemplary example, the material was produced using a blend in which the proportion of magnesium titanate in the blend was 6% by weight.

In contrast to the refractory material of FIG. 1, the sintered grains of chromium oxide (1) are substantially larger. Furthermore, the voids (pores) between the chromium oxide grains are substantially larger and scarcer than in the exemplary example of FIG. 1. Magnesium chromite (2) is present in the form of individual grains between the grains (1) of chromium oxide. In the edge region of the grains formed from magnesium chromite (2), small quantities of metallic chromium (3) can be seen. The reference numeral (4) indicates an impurity arising from polishing the cut surface (lead from the polishing agent employed).

Titanium dioxide cannot be identified optically in the figures.

The invention claimed is:

1. A blend for the production of a refractory material containing sintered chromium oxide, comprising:
   chromium oxide, wherein the chromium oxide has a $D_{90}$ value; and
   magnesium titanate, wherein the magnesium titanate has a $D_{90}$ value, wherein the $D_{90}$ value of the chromium oxide is larger by at least a factor of 1.5 than the $D_{90}$ value of the magnesium titanate.

2. The blend as claimed in claim 1, wherein the chromium oxide has a content of at least 80% by weight.

3. The blend as claimed in claim 1, wherein the magnesium titanate has a content of at most 20% by weight.

4. A method for the manufacture of a refractory material containing sintered chromium oxide, comprising:
   providing a blend comprising chromium oxide and magnesium titanate, wherein the chromium oxide has a $D_{90}$ value, wherein the magnesium titanate has a $D_{90}$ value, wherein the $D_{90}$ value of the chromium oxide is larger by at least a factor of 1.5 than the $D_{90}$ value of the magnesium titanate; and
   firing the blend to form a refractory material.

5. The method according to claim 4, wherein the refractory material further contains magnesium chromite and titanium dioxide.

6. The blend according to claim 1, wherein the blend is fired to obtain a refractory material containing sintered chromium oxide.

7. The blend according to claim 6, wherein the refractory material further contains magnesium chromite and titanium dioxide.

* * * * *